United States Patent [19]

Flanagan

[11] 4,413,855
[45] Nov. 8, 1983

[54] SLIDING PATIO FOR TRAVEL TRAILERS AND MOBILE HOMES

[76] Inventor: Francis Flanagan, Rte. 4, Box 57-F, Athens, Tex. 75751

[21] Appl. No.: 283,559

[22] Filed: Jul. 15, 1981

[51] Int. Cl.³ .............................................. B60G 3/32
[52] U.S. Cl. ................................... 296/162; 52/79.6; 52/143
[58] Field of Search .................. 296/162; 52/67, 79.6, 52/143

[56] References Cited

U.S. PATENT DOCUMENTS

| | | | |
|---|---|---|---|
| 2,760,238 | 8/1956 | Lane | 296/162 |
| 3,515,406 | 6/1970 | Endsley | 296/162 |
| 3,608,951 | 9/1971 | Jackson | 296/162 |
| 3,708,198 | 1/1973 | Coons | 296/162 |
| 3,750,351 | 8/1973 | Greenburg | 52/143 |
| 3,808,757 | 5/1974 | Greenwood | 52/79.6 |
| 4,188,057 | 2/1980 | Pauli | 296/162 |

*Primary Examiner*—Bruce H. Stoner, Jr.
*Assistant Examiner*—John A. Carroll

[57] ABSTRACT

This sliding patio for travel trailers and mobile homes consists primarily of a pair of channel members secured to the underside of the vehicle chassis, and the channel members slideably receive a frame, which is the patio deck. The frame includes hinged hand rails, which are held upright by removable hand rail brackets and the structure further includes an indoor-outdoor carpet secured to a marine plywood base, and a pair of removable and adjustable caster units provide support for the front end of the structure when it is extended outward of the channel members.

8 Claims, 10 Drawing Figures

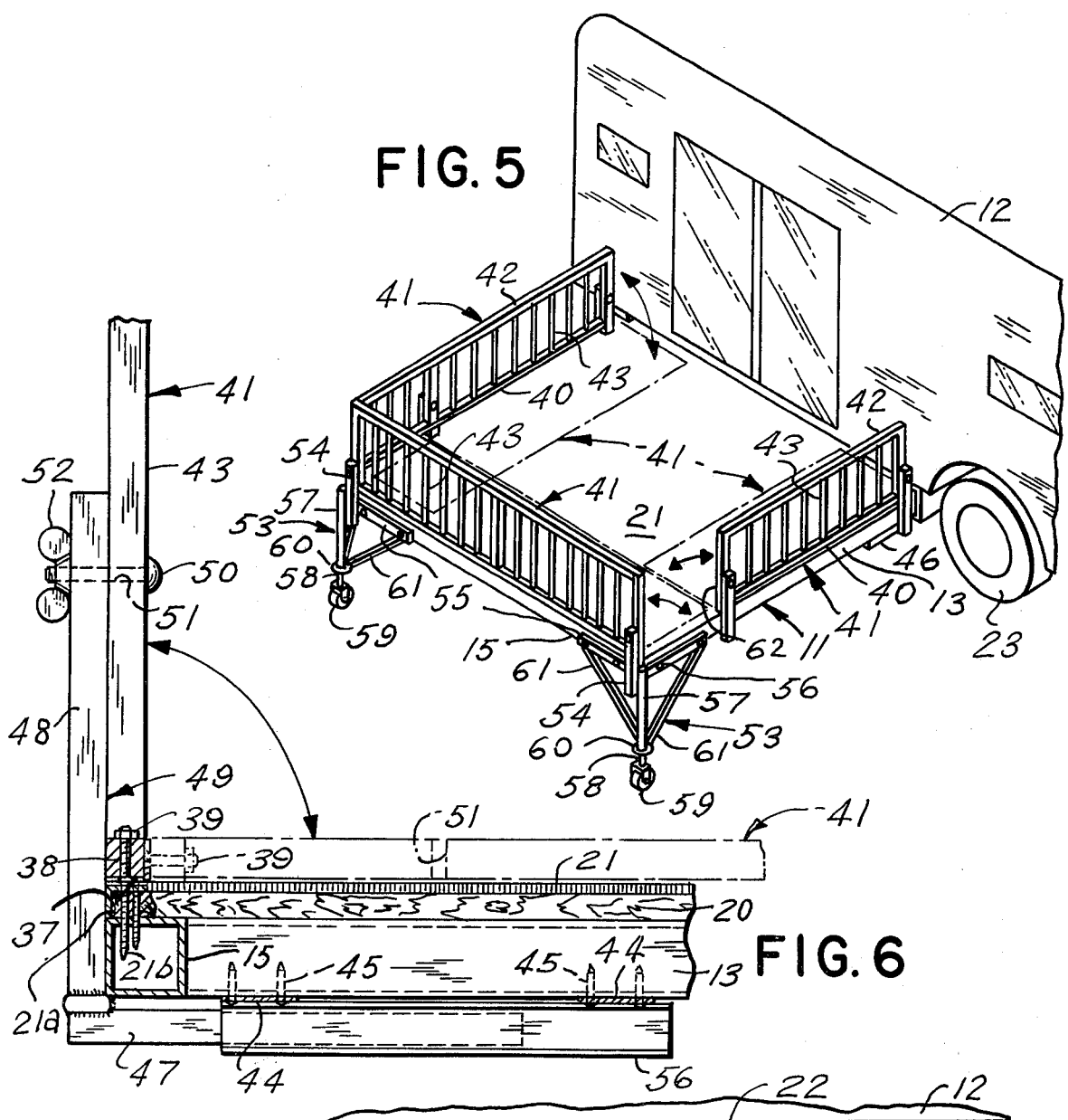
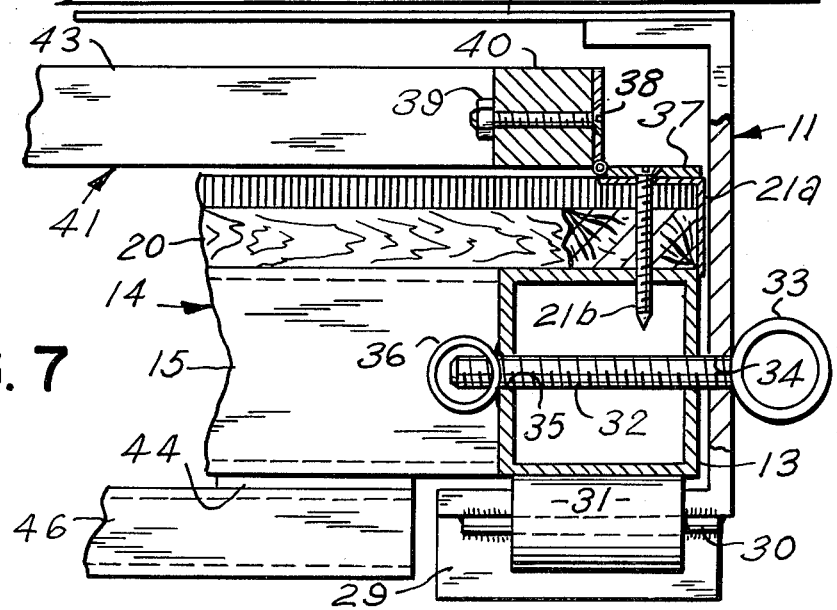

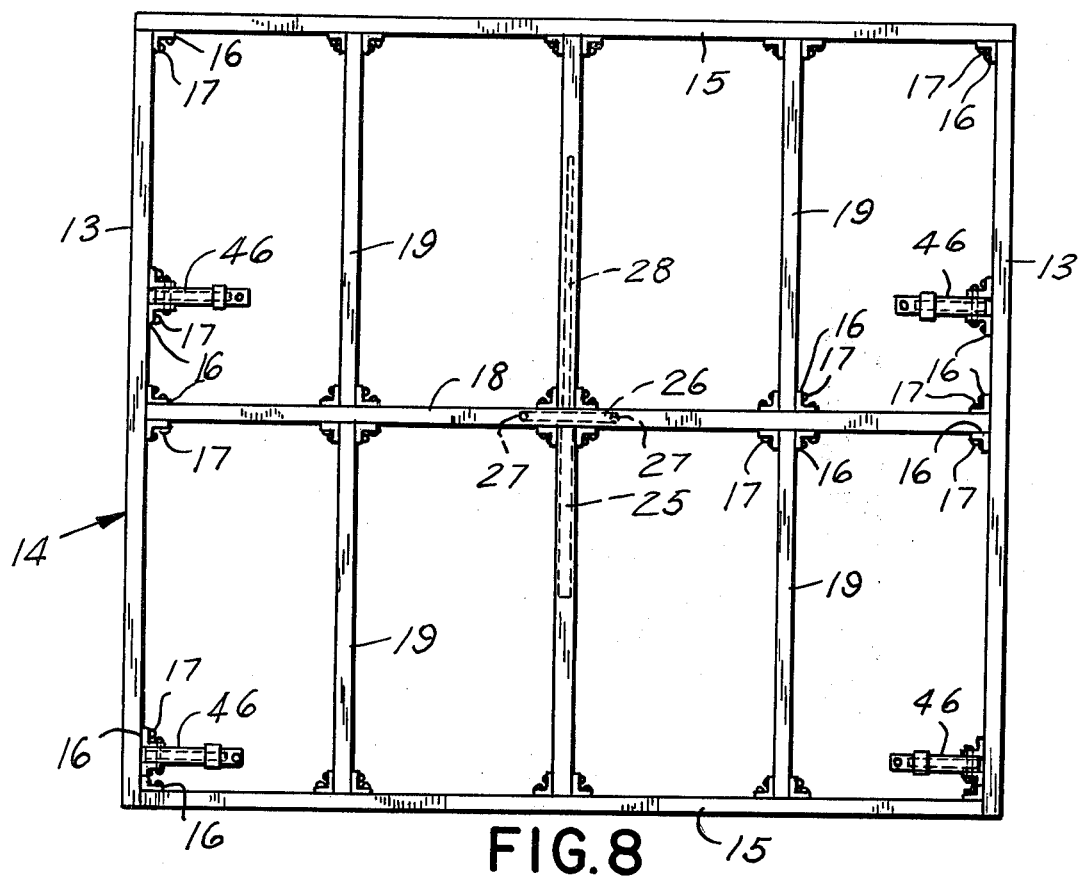
FIG. 8
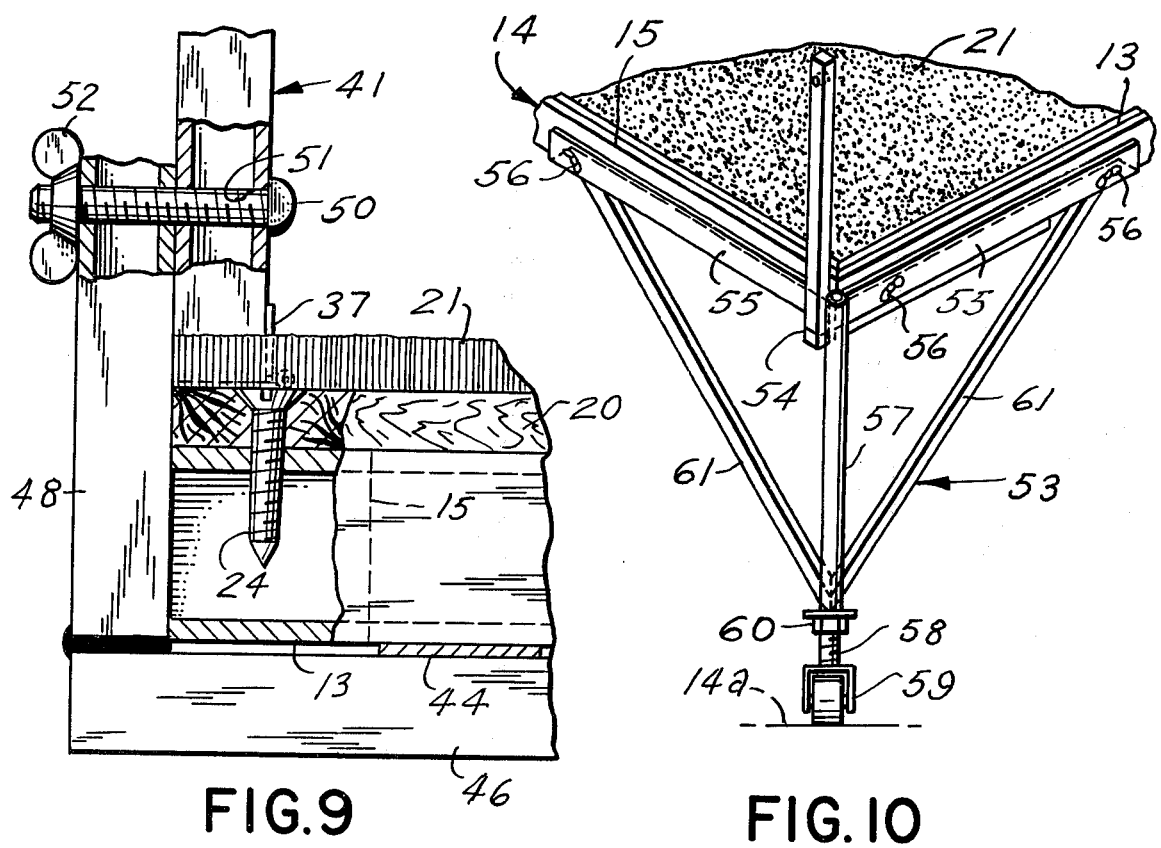
FIG. 9
FIG. 10

SLIDING PATIO FOR TRAVEL TRAILERS AND MOBILE HOMES

This invention relates to patios, and more particularly, to a sliding patio for travel trailers and mobile homes.

It is the principal object of this invention to provide a sliding patio for travel trailers and mobile homes, which will be located below the chassis of the travel trailer or mobile home, and it will slide in and out of a pair of channel members.

Another object of this invention is to provide a sliding patio for travel trailers and mobile homes, which will include folding handrails and adjustable height casters, for supporting it when it is in use.

Another object of this invention is to provide a sliding patio for travel trailers and mobile homes, which will prevent a person from having to build a new one each time he moves.

A further object of this invention is to provide a sliding patio for travel trailers and mobile homes, which will be unique and novel, so as to appeal to people who live in their vehicles all year around, and the structure can be customized, as to width and length.

A still further object of this invention is to provide a sliding patio for travel trailers and mobile homes, which will be safe in use, as well as in travel.

Other objects are to provide a sliding patio for travel trailers and mobile homes, which is simple in design, inexpensive to manufacture, rugged in construction, easy to use, and efficient in operation.

These, and other objects, will be readily evident, upon a study of the following specification, and the accompanying drawings, wherein:

FIG. 5 is a perspective view of the invention, shown fully extended, with the rails in upright position, the folded down positions of the rails being illustrated in phantom lines;

FIG. 6 is an enlarged and fragmentary cross-sectional view of the invention, showing the folded down position of the hand rail in phantom, and illustrates the securement means of the hand rails;

FIG. 7 is an enlarged cross-sectional view of one of the slide channel housings, shown prior to the installation of the roller caster components;

FIG. 8 is an enlarged plan view of the patio support structure, shown with the accessories removed therefrom;

FIG. 9 is an enlarged fragmentary and cross-sectional view, showing further detail of the railing and superstructure of the invention, and FIG. 10 is an enlarged perspective view of a roller caster of the invention, as it would be installed as illustrated in FIG. 3.

Figure 1:
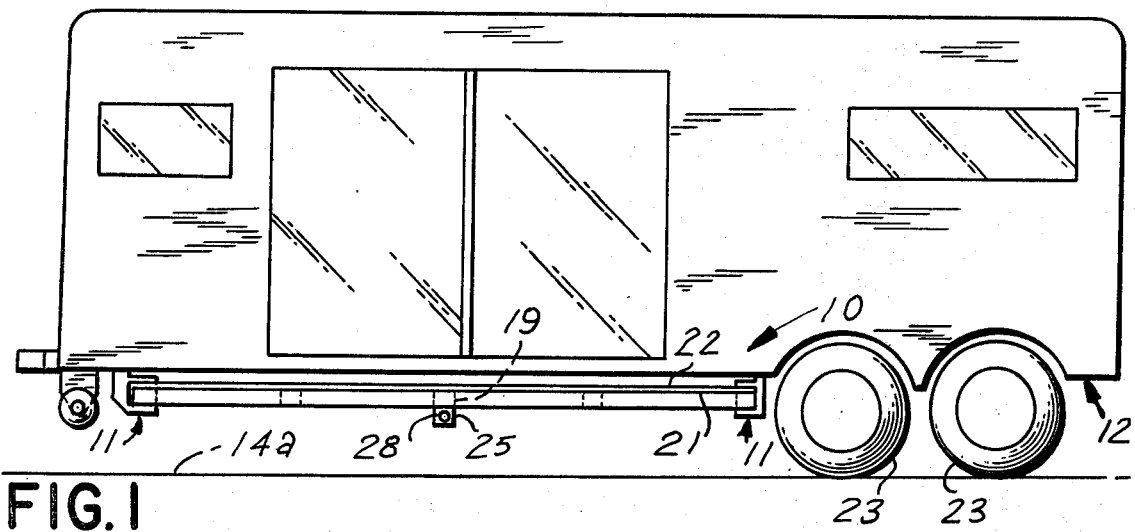
FIG. 1 is a front view of the present invention, shown mounted to the chassis of a trailer, the front end of the trailer being shown elevated.
Figure 2:
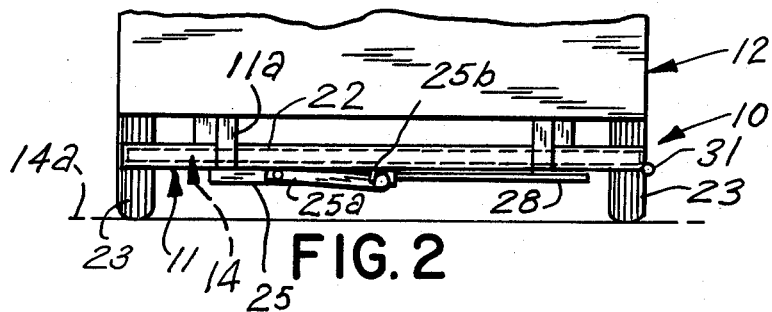
FIG. 2 is an end view of the invention, showing the trailer fragmentary.
Figure 3:
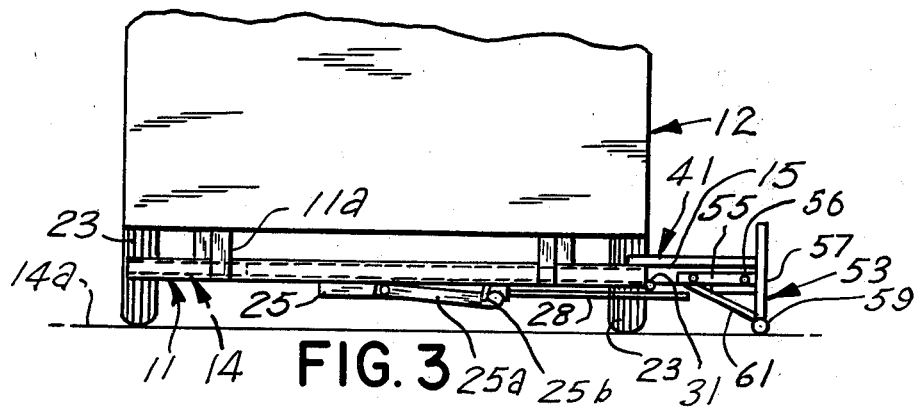
FIG. 3 is similar to FIG. 2, but illustrates the invention partially extended, with the casters and leg portions in place.
Figure 4:
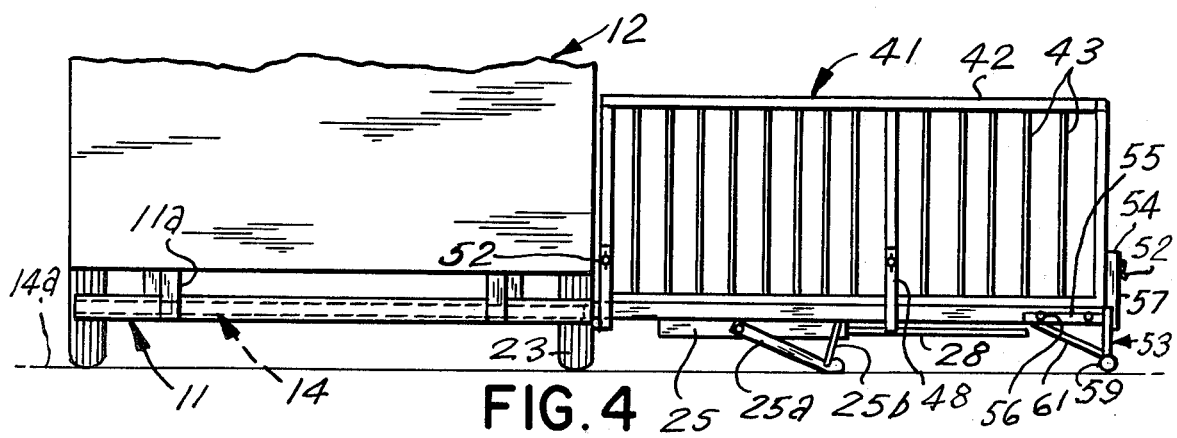
FIG. 4 is similar to FIG. 3, but illustrates the invention fully extended.

According to this invention, a patio structure 10 is shown to include a pair of spaced-apart channels 11, which are fixedly secured to the underside of the trailer 12 chassis 11a. Channels 11 are secured to the chassis by welding or other suitable means, and the aluminum side tubes 13 of frame 14 are freely and slideably received in channels 11, when structure 10 is not in use. Frame 14 includes a pair of longitudinal aluminum tubes 15, which are square in cross-sectional configuration, similar to side tubes 13, and tubes 13 are secured, at their ends, to the ends of tubes 15, by means of brackets 16 and suitable fasteners 17. A center tube 18 is secured to, and between, tubes 13, by means of a pair of brackets 16 and fasteners 17, and a plurality of cross-tubes 19 are secured between, and to, tubes 15 and center tube 18, by means of similar brackets 16 and fasteners 17, so as to provide a strong and durable surface for a marine plywood panel 20 of suitable thickness, which is secured to tubes 13 and 15 by screw fasteners 21. Panel 20 is covered with an indoor-outdoor carpet 21, or other suitable material, for the comfort of the users, and angle edging 21a, for sealing purposes, is held in place by screws 21b, secured at the edges of carpet 21, to hold it down further, and adds to its decorative appearance. A sheet metal panel 22, of a suitable non-corrosive material, is secured, by its edges, to channels 11, over carpet 20, so as to protect it against mud, snow or rain, from the tires 23 of the towing vehicle or trailer 12, and the patio structure 10 is under-coated for protection from the elements. A suitable adhesive may also be used to further hold down the edges of carpet 21, in addition to the screw fasteners 24 and the angle edging 21a. In addition, the carpet 21 provides a non-slip decking for patio structure 10, and a stabilizer structure 25, common in the art, is secured to the underside of center tube 18 by bracket 26 and suitable fasteners 27. Stabilizer 25 includes a crank shaft 28, and stabilizer 25 provides for additional support of the frame components, in the manner known in the art. A bracket 29 is fixedly secured to the bottom of each channel 11 at their front ends, by welding or other suitable means, and the shaft 30 of a roller 31 is welded to each bracket 29, so as to provide for smooth rolling engagement with side tubes 13, when they are moved outwards of channels 11. A threaded locking pin 32, having an eye 33 on one end, is freely and slidably received in opening 34 of each channel 11, and is freely received in transverse openings 35 of tubes 13, the opposite end being threaded into sleeve 36, welded to one side of each of tubes 13. Pins 32 serve as locking means for the patio frame 14, when it is in retracted position for travel.

Screw fasteners 21b also serve as a means of securing hinges 37 to the top of frame 14, and bolt fasteners 38, with nut fasteners 39, secure the opposite sides of hinges 37 to the bottom members 40 of hand rails 41, which fold inward and downward upon frame 14, when structure 10 is to be retracted beneath trailer 12. Hand rails 41 include top members 42, which are fixedly secured to the ends of a plurality of spaced-apart vertical members or posts 43, by welding or other suitable means. A plurality of steel plates 44 are secured to tubes 13 and 15, by means of suitable screw fasteners 45, and plates 44 are welded to the outer periphery of steel tubes 46, which freely and slideably receive a rod 47, to which is welded a rod 48. Rods 48 and 47 are bracket 49 means, for supporting handrails 41 in their upright positions, and a bolt fastener 50 is freely received in openings 51 of members 43 and rods 48, so as to receive a wing nut fastener 52, which will render the hand rails 41 and brackets 49 secure to each other, until frame 14 is to be retracted into channels 11.

Adjustable height caster units 53, which are also removable, include a corner bracket 54 of steel and "L"-shaped configuration, which is welded to the bottom of an "L"-shaped angle member 55 of steel. Angle member 55 is removably secured to the corners of frame 14, by means of a combination of wing nut and bolt fasteners 56. A steel pipe 57 is welded, at one end, to the outside corner portion of angle member 55, and the opposite end threadingly receives an externally threaded stud 58, fixedly secured, in a suitable manner, to a roller caster 59, which is adjustable in height by a nut fastener 60 received on stud 58. An angularly disposed knee brace 61 is fixedly secured, by welding or other means, to pipe 57 and angle member 55, so as to impart maximum rigidity to caster units 53, which are a pair. An opening 62, in the hand rail 41 assembly, provides a means for a person to climb onto, or descent from, frame 14 by steps (not shown).

It shall be noted, that stabilizer structure 25 includes lowerable and pivotal members 25a and 25b, for maximum support of frame 14, the structure 25 being common on the market.

It shall also be noted, that caster units 53 should be installed on the rear of travel trailers when structure 10 is installed behind the rear axle, and the aforementioned structure 10 takes up five inches of space below the chassis 11a.

In use, patio structure 10 is pulled out of channels 11, about eighteen inches, after removing pins 32, and the caster units 53 are attached to the corners of frame 14, by the fastener combinations 56. They are then adjusted in height, by means of the nut fasteners 60, after which, structure 10 is fully extended and the hand rail brackets 49 are installed in their respective sleeves or tubes 46. The hand rails 41 are then pivoted upright on their hinges 37 and bolted in place to the rods 48, by means of the bolt 50 and wing nut fasteners 52. The stabilizer 25 is then adjusted for maximum support of frame 14 on the ground 14a, and the patio structure 10 is ready for use. When it is desired to travel, the reverse procedure of the above mentioned is used, and it is important, that the locking pins 32 be replaced in their respective sleeves 36 and openings 34 and 35, so as to prevent frame 14 from sliding out of channels 11, when the trailer 12 is in motion.

While various changes may be made in the detail construction, it is understood that such changes will be within the spirit and scope of the present invention, as is defined by the appended claims.

What I now claim is:

1. A travel trailer or mobile home, having a patio that is slidable between a stored-away and utility positions, comprising, in combination, a chassis mounted at its rear upon wheels, a hitch at the front of said chassis for support from the rear of a towing vehicle, a trailer body upon said chassis, and a retractable patio assembly mounted on an underside of said chassis, said patio assembly comprising a pair of parallel, spaced-apart channels affixed to said chassis underside, grooves of said channels facing each other, so as to form guide rails, a frame slidably supported in said guide rails, and being sidewardly slidable partly outward from under said chassis, a plywood panel mounted upon said frame, a carpet mounted upon said panel, a hand rail hinged along edges of said frame, and being pivoted downwardly against the top of said carpet, when said frame is in slided position under said chassis, a protective cover affixed between said channels extending across the top of said downwardly pivoted hand rail, and preventing roadway mud from being splashed upon said carpet, a pair of locking pins removably secured in said channels and said frame for preventing accidental sliding of said frame from under said chassis during travel of said travel trailer or mobile home, a plurality of angled hand rail brackets being removably received in sleeves affixed to said frame, for rigidly holding said hand rail in vertically upright pivoted position, when said frame is in said outwardly slided position, for the safety of persons upon said patio, a pair of downwardly adjustable caster units removably attachable to outward corners of said frame, for support upon the ground when in said outwardly slided position, and a downwardly adjustable stabilizer secured under the center of said frame, for resting upon said ground when in said outwardly slided position.

2. The combination according to claim 1, wherein said frame is rectangular in configuration and includes a pair of side tubular members fixedly secured at their ends, to the ends of a pair of longitudinal tubular members, and a center and longitudinal tubular member is fixedly secured at its ends, between said pair of side tubular members, said frame including a plurality of spaced-apart cross-members of tubular configuration, which are fixedly secured in a suitable manner, at each end, to and between said pair of longitudinal tubular members and said center and longitudinal member, and said stabilizer member is fixedly secured in a suitable manner, to, and in alignment with, a center one of said cross-members.

3. The combination according to claim 2, wherein said panel is secured to the top side of said side tubular members and said longitudinal tubular members, by a plurality of screw fasteners, and said carpet is secured to said panel at its edges, by a plurality of angle strip members and screw fasteners, so as to provide sealing means for said carpet and panel at said edges.

4. The combination according to claim 3, wherein said pair of locking pins are each removably received through one of said channels and one of said side tubular members, and a sleeve is fixedly secured to one side of said channels, said locking pins being threadably received transversely through said sleeve, so as to prevent outward travel of said frame when not in use.

5. The combination according to claim 4, wherein said sleeves receiving said hand rail brackets are fixedly secured to plates by screw fasteners, and said plates are welded to the undersides of said side tubular members, said hand rail brackets being "L"-shaped in configuration, one end being removably received in one of said sleeves and the other end being secured to an upright post of a plurality in said hand rails, and said hand rail brackets are secured to said upright posts by bolt and wing nut fasteners, so as to keep said hand rails rigidly upright, and the lower longitudinal member of said hand rails is secured by a plurality of screw fasteners, to one side of hinges, and the opposite side of said hinges are secured by screw fasteners to said carpet, said panel, said tubular side members and said longitudinal tubular members of said frame.

6. The combination according to claim 5, wherein said caster units include an "L"-shaped angle member secured by bolt and wing nut fasteners to a front corner of said frame, and a pipe is fixedly secured by suitable means, at one end, to the corner portion of said "L"-shaped angle member, the opposite end of said pipe threadingly receiving a threaded stud, and said stud is fixedly secured to a rolling caster.

7. The combination according to claim 6, wherein a post of said unit is fixedly secured at one end to the upper end of said pipe and the opposite end of said post of said unit removably receives a corner of the hand rail on the front of said frame, by wing nut and bolt fastener means.

8. The combination according to claim 7, wherein a nut fastener is received on said stud of said caster, and enables said caster to be lowered or raised to any desired elevation, and when the desired elevation is found, said nut fastener is rotated against said pipe, for holding the elevation set.

* * * * *